United States Patent [19]

Davies, III et al.

[11] 4,071,922
[45] Feb. 7, 1978

[54] FOLDABLE HANDLE

[75] Inventors: John W. Davies, III, Plymouth; Edward W. Enters, Fredonia; Eugene A. DuPas, Plymouth, all of Wis.

[73] Assignee: Gilson Brothers Company, Plymouth, Wis.

[21] Appl. No.: 776,516

[22] Filed: Mar. 11, 1977

Related U.S. Application Data

[62] Division of Ser. No. 660,127, Feb. 23, 1976, Pat. No. 4,011,913.

[51] Int. Cl.² .................... A01B 33/02; A01B 33/08; B62D 51/04
[52] U.S. Cl. ........................................ 16/112; 172/42; 280/42.37 R
[58] Field of Search ............................ 16/111 A, 112

[56] References Cited

U.S. PATENT DOCUMENTS

| | | | |
|---|---|---|---|
| 2,138,239 | 11/1938 | Irgens | 180/19 H |
| 2,292,580 | 8/1942 | Moyer et al. | 56/11.6 |
| 2,435,022 | 1/1948 | Troendle | 280/47.37 R UX |
| 2,453,819 | 11/1948 | Smith | 180/19 H |
| 2,453,999 | 11/1948 | Melling | 180/19 H |
| 2,608,102 | 8/1952 | Wilkin | 180/19 H UX |
| 2,791,079 | 5/1957 | Funk | 56/11.6 |
| 3,444,945 | 5/1969 | Coordes et al. | 180/19 H |
| 3,527,469 | 9/1970 | Gobin | 280/47.37 R |
| 3,613,814 | 10/1971 | Prien, Jr. | 180/19 H |
| 3,771,385 | 11/1973 | Benoit et al. | 74/548 X |
| 3,800,616 | 4/1974 | Hoffmeyer et al. | 180/19 H X |
| 3,816,873 | 6/1974 | Thorud et al. | 16/111 A |

FOREIGN PATENT DOCUMENTS

| | | | |
|---|---|---|---|
| 179,113 | 4/1962 | Sweden | 16/111 A |

Primary Examiner—Louis K. Rimrodt
Attorney, Agent, or Firm—Michael, Best & Friedrich

[57] ABSTRACT

A folding tiller handle is made in two pieces connected for limited relative longitudinal and pivotal movement, one piece being a permanent part of the basic tiller assembly. A belt tightening idler sheave is associated with a belt drive which provides the motive force for rotating the tiller tine assembly. A control, which includes two separable rigid rod members, moves the idler sheave into and out of tightening engagement with the drive belt. The rods are joined through a connection which imparts rotary motion from one rod to the other and which also permits relative longitudinal movement therebetween to separate the rods. The rods are associated with respective pieces of the tiller handle so that when the handle is separated or folded, the control connection to the tightening sheave through the rods is interrupted and the drive belt cannot be tightened to establish the tiller drive.

8 Claims, 9 Drawing Figures

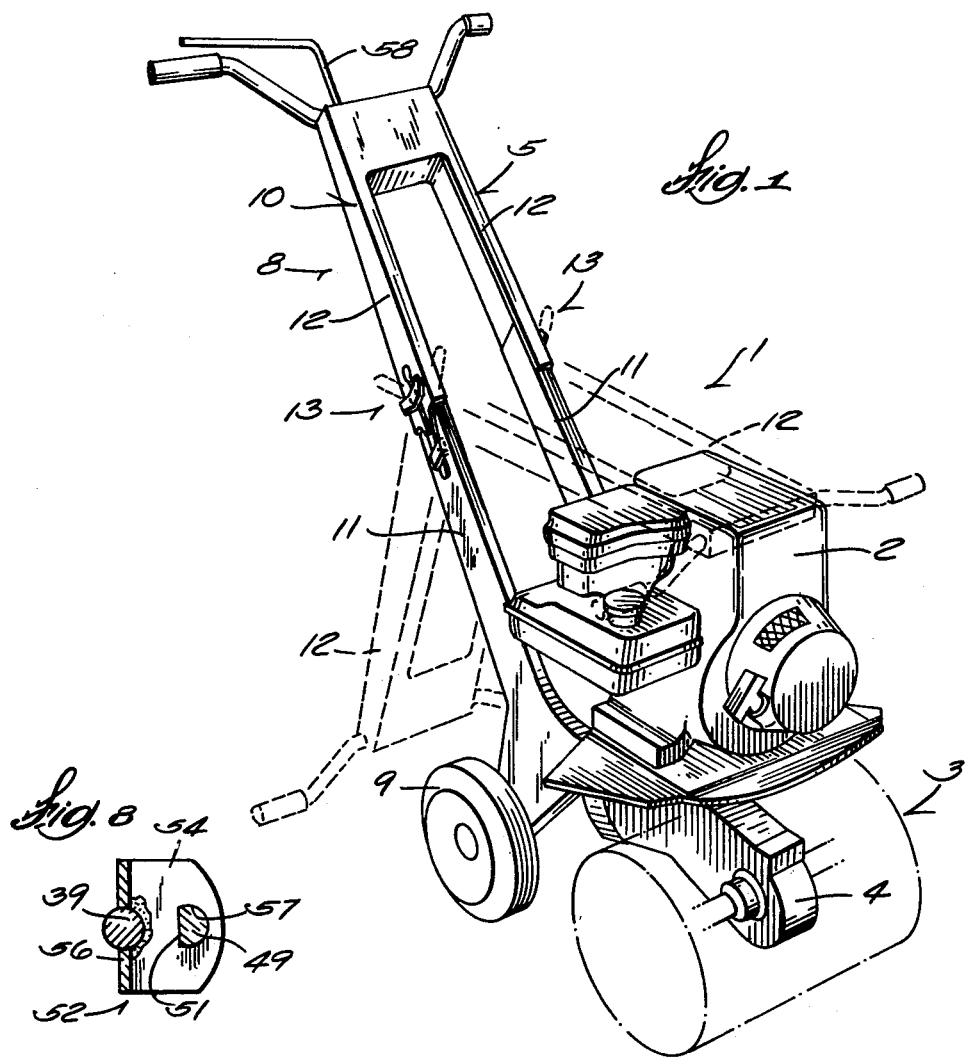
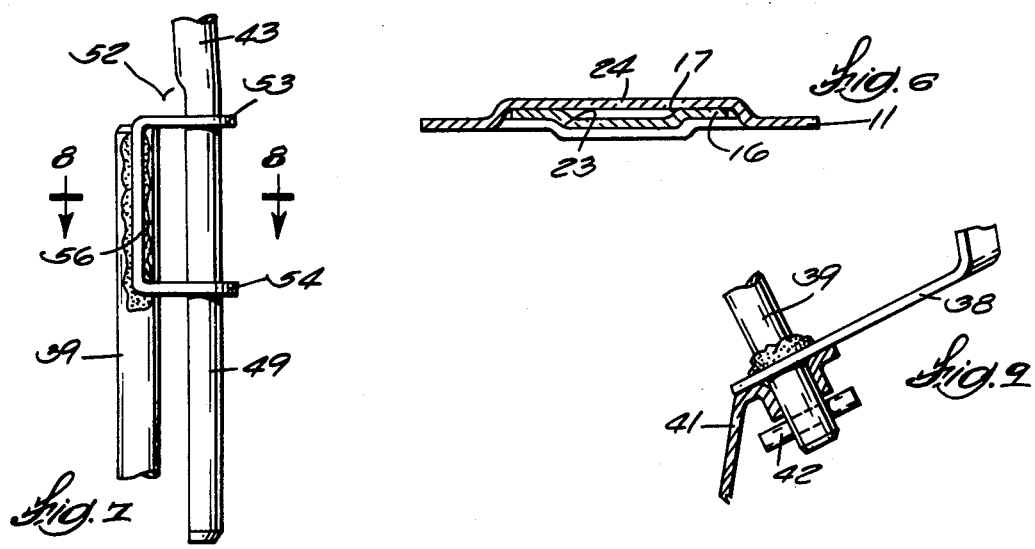

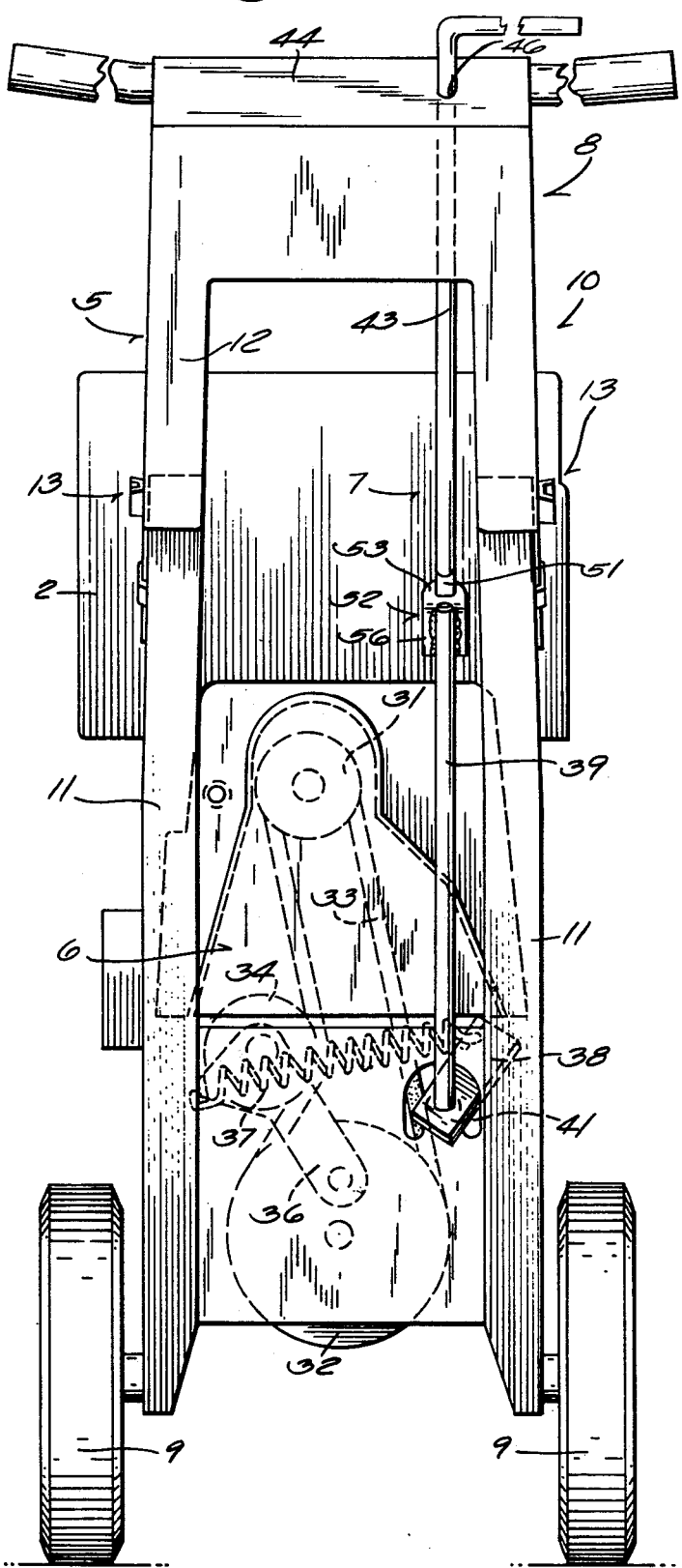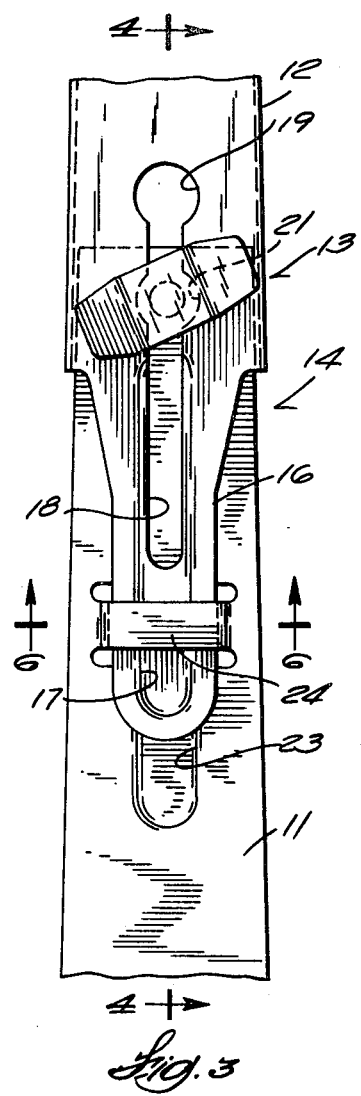

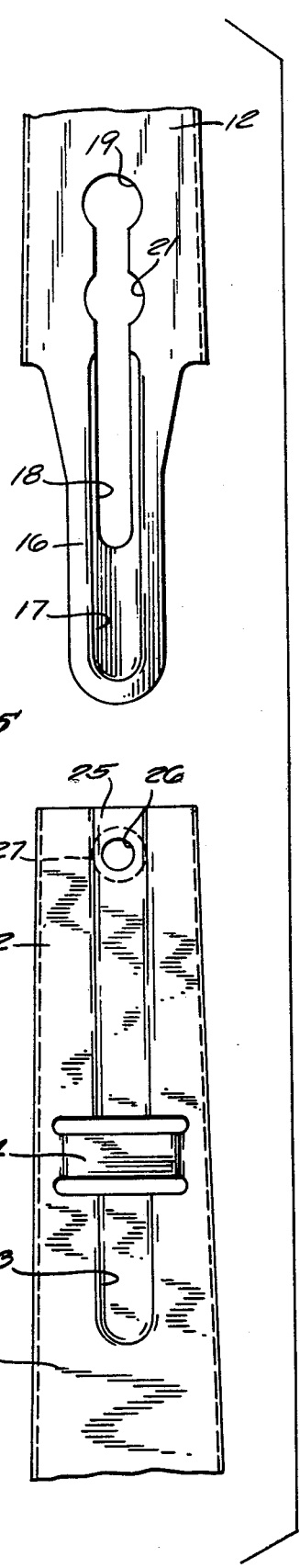
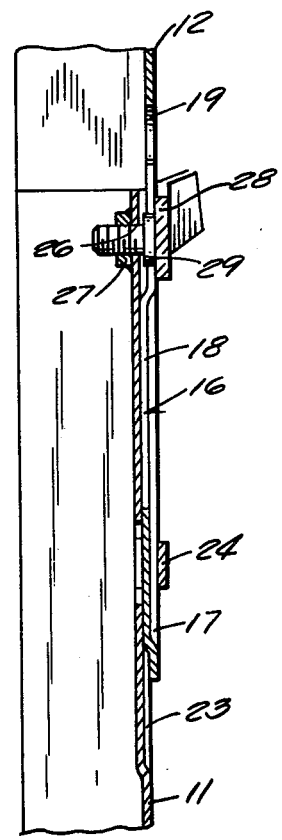

FOLDABLE HANDLE

CROSS REFERENCE TO RELATED APPLICATIONS

This application is a division of application Ser. No. 660,127, filed Feb. 23, 1976, now U.S. Pat. No. 4,011,913, granted Mar. 15, 1977.

BACKGROUND OF THE INVENTION

This invention relates to tillers and, more particularly, to a combined handle-clutch control mechanism for such tillers.

In the past, it has been known to provide folding handles for tillers and similar power implements. The clutch control in those arrangements have generally been of the bowden wire type such that the control connection to the tiller clutch mechanism is not interrupted when the handle is folded. This presents a potentially unsafe condition in that the tiller could then be operated inadvertently, or intentionally, with the handle folded resulting in operation in a hazardous manner.

This invention is concerned with this problem and has as one of its general objects, to provide a folding handle arrangement with an associated clutch control mechanism such that, when the handle is folded, the clutch control is rendered inoperative and the clutch mechanism cannot be engaged.

SUMMARY OF THE INVENTION

For the achievement of this and other objects this invention proposes a clutch control for a tiller which is operatively associated with a folding handle in such a manner that when the handle is folded the control connection to the clutch is interrupted and the clutch cannot be engaged.

Preferably, the folding handle is made up of two portions connected such that the portion which is not a fixed part of the remainder of the tiller assembly (including an engine, tine assembly, and clutch mechanism) is supported for limited movement to release it for pivotal movement into a folded position. The clutch control similarly has two portions, one associated with the fixed portion of the folding handle and the other with the movable portion thereof. Those two portions are connected to the clutch mechanism such that control movement of those portions is transmitted to the clutch mechanism to selectively establish a drive connection from the engine to the tine assembly or interrupt that drive connection. The two clutch control portions are connected such that when the handle portions are connected in their normal operating configuration, they establish a control connection to the clutch but when the movable handle portion has been moved to release it for folding movement, the connection between the clutch control portions is interrupted and the clutch mechanism cannot be operated through the clutch control.

With this arrangement, the versatility of a folding handle for the tiller, or similar power implement, is provided but is coordinated with the clutch control to prevent operation of the tiller when the handle is folded. This alleviates a potentially hazardous operational condition of the tiller.

Other objects and advantages will be pointed out in, or be apparent from, the specification and claims, as will obvious modifications of the embodiment shown in the drawings, in which:

FIG. 1 is a perspective view of a tiller embodying this invention;

FIG. 2 is a rear view of the tiller of FIG. 1;

FIG. 3 is an enlarged view of the handle connection;

FIG. 4 is a section along line 4—4 of FIG. 3;

FIG. 5 is an exploded view of the handle sections of FIG. 3;

FIG. 6 is a section along line 6—6 of FIG. 3;

FIG. 7 is an enlarged view of clutch control members;

FIG. 8 is a section along line 8—8 of FIG. 7; and

FIG. 9 is an enlarged view of the lower end of the clutch control members.

DESCRIPTION OF THE PREFERRED EMBODIMENT

As illustrated in a general manner in the drawings, a tiller 1 includes an engine 2, a tine assembly 3 and a gear box assembly 4. A clutch arrangement 6 is provided between the engine and the gear box to permit selective interruption of the drive connection between the engine and the tine assembly. In operation, the tine assembly is rotated in a generally clockwise direction.

A clutch control mechanism 7 is associated with the tiller handle 8 to provide for selective control over the completion and interruption of the drive connection between the engine and gear box.

The assemblies and subassemblies mentioned to this point make up the basic tiller construction. To perform a tilling operation, engine 2 is started by a hand pull cord, clutch 6 is engaged to complete the drive connection to the tine assembly and the tiller is advanced on wheels 9 as the tine assembly is rotating to accomplish the tilling operation.

In accordance with this invention, the tiller is provided with a folding handle the construction of which will now be described more specifically. The handle is made up of two extensions 5 and 10. Since both extensions 5 and 10 have the same construction only one will be described, the description being applicable to both. The same identifying numbers will be applied to corresponding parts of each so that the description can be read on both.

Each handle extension includes an elongated lower portion 11 fixed to the basic engine-gear-box-clutch-tine assembly of the tiller. An upper elongated portion 12 is movable relative to the lower portion. Connecting means 13 at the adjacent ends of the upper and lower handle portions is such that the upper portion is capable of limited longitudinal movement relative to the lower portion and also capable of pivoting relative to the lower portion. More specifically and with reference to FIGS. 3, 4, and 5, end 14 of the movable handle portion is reduced to form a blade extension 16. The blade extension includes an elongated recess 17 and an elongated slot 18 extending part way through the recess 17 and beyond the recess into the main portion of the handle. The recess and slot are arranged parallel to, preferably on, the longitudinal axis of the movable portion 12 of the handle. Enlarged circular areas 19 and 21 are provided in slot 18 in the portion thereof which extends into the main part of the movable handle portion.

The free end 22 of the fixed handle portion is provided with an elongated recess 23, which is also parallel to and preferably on the longitudinal axis of the lower fixed portion of the handle. A strap 24 is formed from a portion of end 22 and extends over the recess 23 intermediate the ends of the recess. A hole 26 is provided in the recess 23 and a nut 27 is welded to the back or inside of the recess at hole 26 and receives a wing bolt 28. The wing bolt includes a pilot portion 29 having a diameter corresponding generally to that of circular areas 19 and 21 so that it can be received in one or the other of those areas. Recess 23 is open at end 25 of handle portion 11 so that recess 17 can slide into recess 23.

The handle is assembled by sliding blade 16 into recess 23 behind strap 24. Relative to each other, recesses 17 and 23 are complimentary and nest one within the other in the assembled handle. After the blade has been positioned behind strap 24, wing bolt 28 is inserted in hole 26 with pilot 29 aligned with one or the other circular areas 19 or 21 and the wing bolt threaded down to clamp the two handle portions together. Strap 24 assists in holding the two ends together so that the handle connection does not rely solely on the clamping force provided by the wing bolt. The provision of the two circular areas 19 and 21 permits some limited adjustment in the extension of the handle. Obviously, more circular areas can be provided and the wing bolt can be tightened down other than at the circular areas to afford still more adjustment.

When the tiller is not in use and the handle is to be folded for storage, the wing bolt is relieved but not completely withdrawn from nut 27. With the clamping force relieved, the upper handle portion is withdrawn until blade 16 clears strap 24, at which point recess 17 can be sprung from recess 23 and the handle folded in either a clockwise or counterclockwise direction to nest either over the engine or at the back of the tiller (the dotted line showings in FIG. 1). The mating recesses on the two handle portions, together with the strap and wing bolt connection, provide a rigid interconnection of the handle parts during operation. But that connecting means also permits ready release so that the handle can be folded and without necessitating separation of the upper handle from the main tiller.

In accordance with this invention, clutch control mechanism 7 is operatively associated with extension 10 of the handle such that when the handle is folded, or separated, the clutch cannot be operated to complete the drive connection to the engine. Therefore, with the handle folded, even though the engine may be started, the tine assembly cannot be rotated.

A general understanding of the clutch mechanism will be helpful to an understanding of the control for that mechanism. The clutching mechanism is more specifically described and claimed in the co-pending application of Edward W. Enters and Mark J. Itle, filed Feb. 23, 1976 Ser. No. 660,129, entitled Clutch Mechanism for Rotary Tillers and the Like and assigned to the assignee of this invention. If details beyond those now to be given are required, reliance is placed on that copending application. A drive sheave 31 is connected to the crank shaft of engine 2, driven sheave 32 is connected to the gear box, and belt 33 extends between those two sheaves. The belt is of a length to fit loosely on both sheaves with idler sheave 34 supported to be moved to tighten the belt on the drive and driven sheaves to establish the drive connection. Idler sheave 34 is supported on a bracket 36 pivotally attached to the gear box of the tiller. To complete the drive connection, the bracket 36 is pivoted in a clockwise direction to tighten the belt on sheaves 31 and 32. When released, the bracket and idler sheave fall counterclockwise by gravity. To selectively impart this clockwise movement to the idler, a tension spring 37 is connected between bracket 36 and an arm 38. Arm 38 is welded to a lower control rod 39 and is journaled in a flap 41 provided on the frame of the tiller. The end of clutch control rod 39 extends through an opening in the flap and pin 42 prevents withdrawl of the control rod from that opening. Arm 38 and spring 37 provide motion transmitting means whereby rotation of control rod 39 in a clockwise direction is transmitted to the idler to tighten the belt, the spring accommodates overtravel movement without excessive tension being placed on the belt.

With reference now to the upper handle portion 12, upper control rod 43 is associated with that handle portion. The upper control rod extends through a hole 46 in handle shelf 44 and is pinned to prevent withdrawal of the rod through that hole. A connection is provided between the adjacent ends of the upper and lower control rods which permits rotation to be transmitted between those rods but also permits the upper rod to be separated from the lower rod. More specifically, the upper control rod 43 includes a shaped end 49 (see FIGS. 7 and 8). The rod is basically circular in cross section and a flat 51 is provided on the end. A coupling member 52 is welded to the upper end of control rod 39. The coupling includes arms 53 and 54 and a web 56, the latter being welded to the end of the control rod. Arms 53 and 54 are provided with holes 57 having a shape conforming to and closely engaging the shaped end 49.

With this control rod construction, when handle portion 12 is moved longitudinally to permit folding as described above, the upper control rod portion is withdrawn from coupling 52 thereby interrupting the control linkage. The idler sheave cannot be moved into engagement with belt 33 regardless of how the upper handle portion is manipulated and the drive connection to the tine assembly is positively interrupted while the handle is folded. When the handle is reassembled to its operative condition, the operator must positively locate and insert the shaped end 49 of the upper control rod into holes 57 of coupling 52 and the engagement with the coupling will not be accomplished unless the handle is properly connected. These are all safeguards against improper operation of the tiller. The rods 39 and 43 are rigid, as compared to cable arrangements such as bowden wires, this facilitates the making of the proper connection just discussed.

Rotation of the control rod is achieved through a control handle 58 located at the top of the handle 8. Since the bracket and idler sheave 34 will normally fall away from the belt and will engage the belt only when positively moved in that direction, the control handle must be rotated and held in position to establish and maintain the drive connection. Should the operator lose his grip on the control handle for any reason, the idler will be released and fall away from the belt interrupting the drive connection, thereby providing a "dead man" safety feature.

Although this invention has been illustrated and described in connection with a particular embodiment thereof, it will be apparent to those skilled in the art that various changes and modifications may be made therein without departing from the spirit of the invention or from the scope of the appended claims.

We claim:

1. A foldable handle assembly comprising
   a fixed elongated handle portion having a first free end portion;

a movable elongated handle portion having a second free end portion; and connecting means joining said fixed and movable handle portions and operative to selectively clamp said fixed and movable handle portions against relative pivotal movement in a normal position where the longitudinal axis of said fixed and movable handle portions are aligned and further operative to release said movable handle portion for limited longitudinal movement relative to said fixed handle portion sufficient to release said movable handle portion for pivotal movement relative to said fixed handle portion from the normal position to a folded position, said connecting means including a blade extension formed as part of one of said first and second free end portions, an elongated slot in said one of said first and second free end portions and extending parallel to the longitudinal axis of the respective of said fixed and movable handle portions, a strap on the other of said first and second free end portions and spaced outwardly therefrom for slidably receiving said blade extension thereunder when said movable handle portion is in the normal position, a lock opening in said other of said first and second free end portions, said slot and said lock opening being aligned when said blade extension is positioned under said strap, and fastening means extending through said lock opening and said slot and selectively operative to clamp said fixed and movable handle portions in the normal position against longitudinal movement and to free said movable handle portion for sufficient longitudinal movement relative to said fixed handle portion to withdraw said blade extension from said strap while maintaining a connection between said fixed and movable handle portions to afford pivotal movement of said movable handle portion relative to said fixed handle portion from the normal position to a folded position.

2. A foldable handle assembly according to claim 1 wherein said strap is formed as an integral part of said other of said first and second free end portions.

3. A foldable handle assembly according to claim 1 including means defining a plurality of circular areas spaced along said slot, and means on said fastening means corresponding to the configuration of said circular areas and selectively receivable therein.

4. A foldable handle assembly according to claim 1 wherein said fastening means includes a wing bolt having a threaded portion extending through said lock opening, and a part on said other of said first and second free end portions having a threaded opening aligned with said lock opening and threadably receiving said threaded portion of said wing bolt.

5. A foldable handle assembly according to claim 1 wherein said fixed handle portion includes first and second laterally spaced extensions, each having a free end portion, said movable handle portion includes third and fourth laterally spaced extensions, each having a free end portion, said free end portions of each of the ones of said first and second extensions or said third and fourth extensions include a said blade extension, said free end portion of each of said ones of said first and second extensions and said third and fourth extensions includes a said slot, said free end portion of each of the others of said first and second extensions and said third and fourth extensions includes a said strap, and said free end portion of each of said others of said first and second extensions and said third and fourth extensions includes a said lock opening.

6. A foldable handle assembly according to claim 5 wherein said straps are formed as an integral part of respective ones of said others of said first and second extensions and said third and fourth extensions.

7. A foldable handle assembly according to claim 6 wherein said fastening means includes a pair of wing bolts, each having a threaded portion extending through respective of said lock openings, and a part on each of said others of said first and second extensions and said third and fourth extensions, each having a threaded opening aligned with the respective of said lock openings and threadably receiving said threaded portion of the respective of said wing bolts.

8. A foldable handle assembly according to claim 7 wherein each of said free end portions of said third and fourth extensions includes a said blade extension and a said slot, and each of said free end portions of said first and second extensions includes a said strap, a said lock opening, and a said threaded part.

* * * * *